Aug. 25, 1959
H. L. DUNLAP
2,900,925
FREIGHT SECURING BAR
Filed Jan. 7, 1955
2 Sheets-Sheet 1
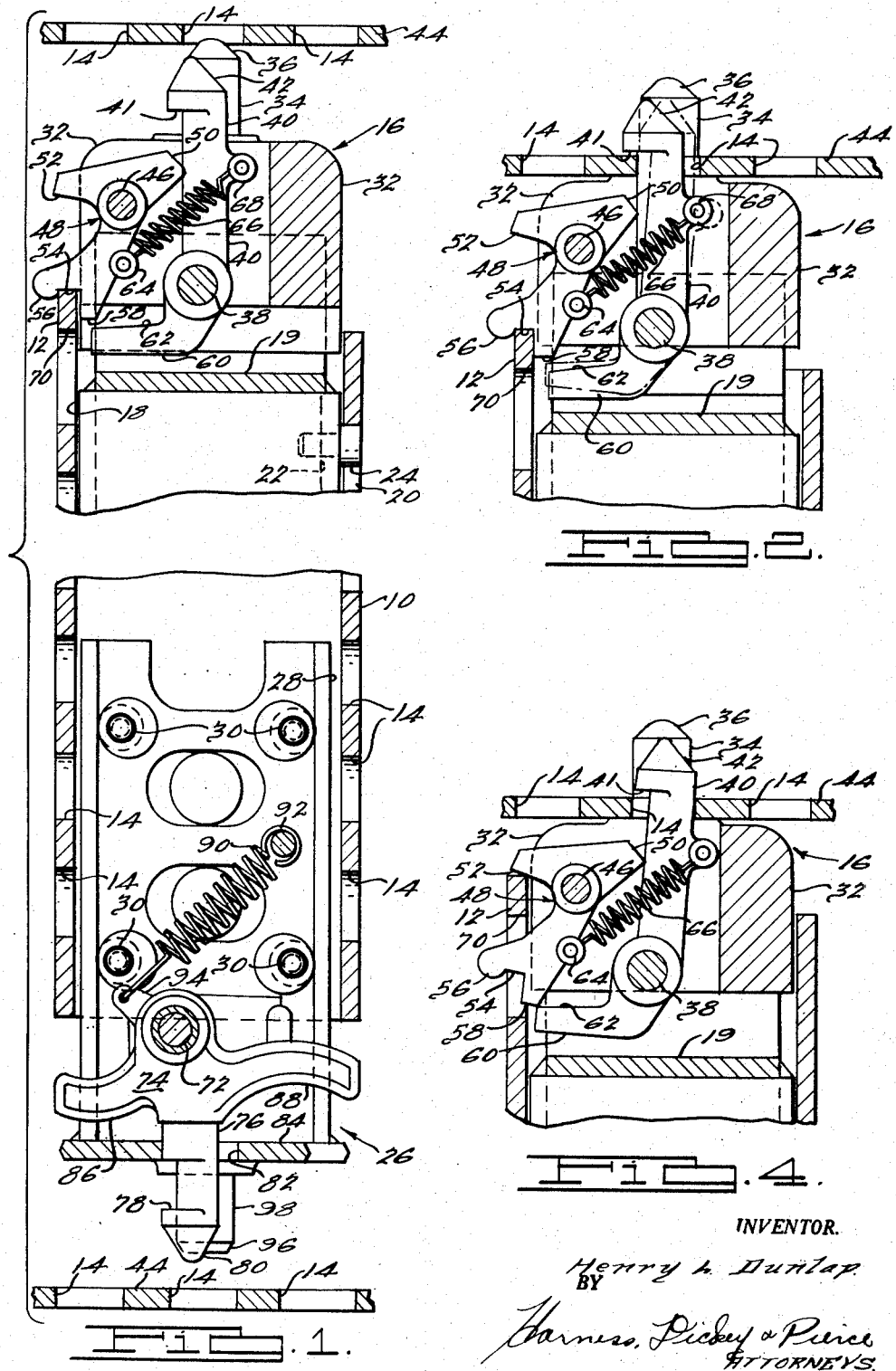
INVENTOR.
Henry L. Dunlap
BY
Harness, Dickey & Pierce
ATTORNEYS.

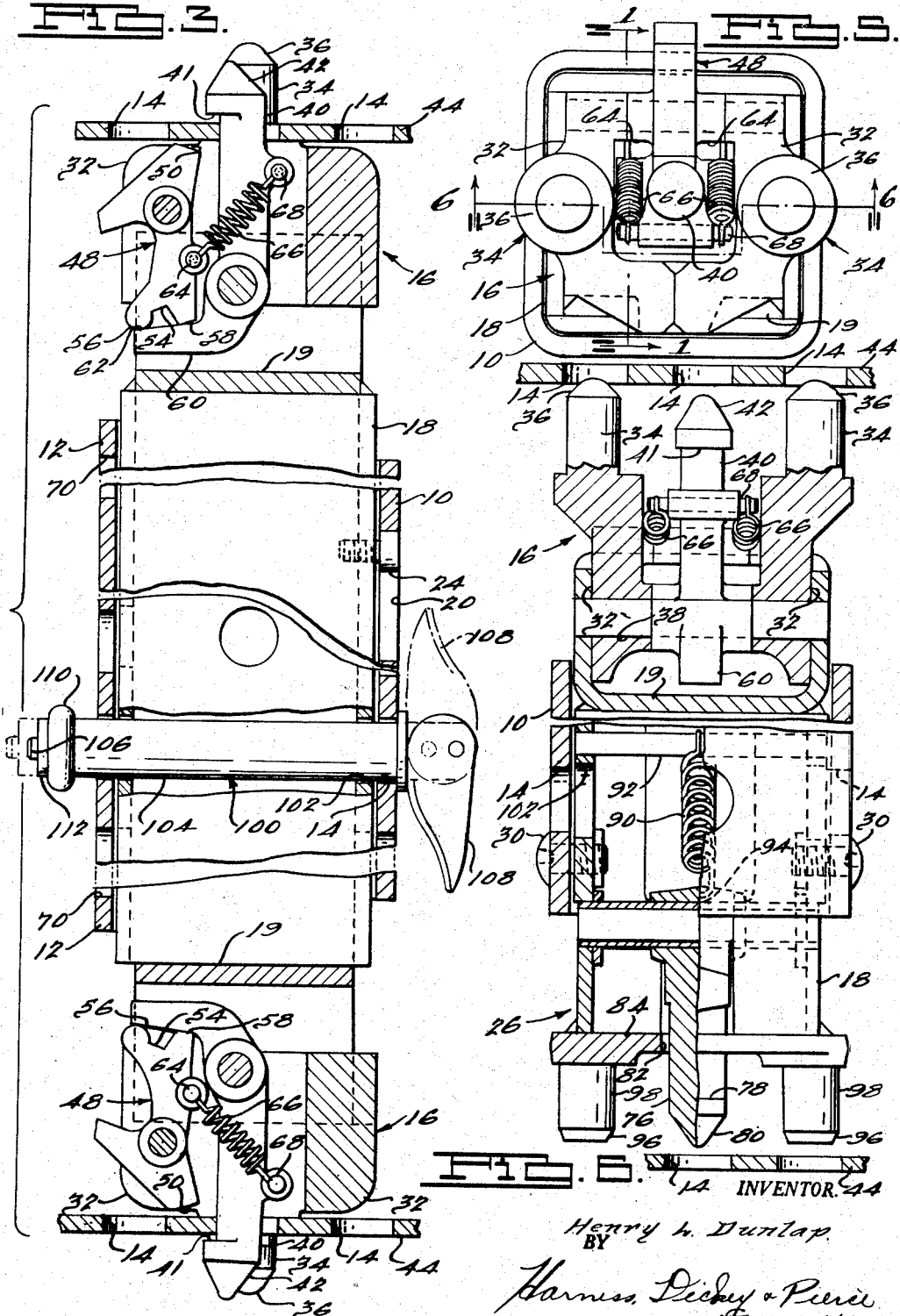

United States Patent Office 2,900,925
Patented Aug. 25, 1959

2,900,925

FREIGHT SECURING BAR

Henry L. Dunlap, Dearborn, Mich., assignor to Evans Products Company (Delaware)

Application January 7, 1955, Serial No. 480,549

9 Claims. (Cl. 105—369)

The present invention is related generally to freight loading and storing apparatus for use in freight storage areas or in freight and cargo hauling vehicles such as ships, airplanes, railroad cars, highway trucks, and the like. More specifically, the invention relates to a remotely-operated latching device for freight bracing members for use on freight loading apparatus of the type employing a pattern of members affixed to opposite surfaces enclosing a freight storage area, which members have a series of holes in their exposed surfaces.

Very often the stored articles or freight cannot be left in a loose condition in the storage space, simply resting on each other and on the freight supporting surface. This is particularly true when the articles are in a movable conveyance such as a freight car, an airplane, a ship or a truck where there is danger that the articles, no matter how heavy, will move about causing injury to themselves or to the conveyance; or in the case of storage of ammunition components, causing possibly an explosion. Thus it is common practice to provide dunnage or freight-holding equipment to engage the individual articles or groups of articles, or to be otherwise used to brace the articles against movement relative to the bounding surfaces of the chamber in which they are stowed. Freight bracing members are conventionally used for this purpose and they are constructed so they can be fixed in certain positions relative to the opposite bounding surfaces (e.g. sidewall and sidewall, or freight supporting surface and overhead) so that they will resist shifting of the articles. In order for a freight bracing member to be fixed to a bounding surface, the members and the surface must each be provided with a means that will cooperate with the other to achieve this result. Many such combinations of means are known, such as pins on the members and holes in the surfaces or jaws on the members and rails on (or in) the surfaces. Inasmuch as the nature and shape of the load can vary almost infinitely, the bounding surfaces are provided with many bar-fixing means so that cross members can be fixed in as many different positions as possible.

In a co-pending application of Harvey W. Chapman and Henry L. Dunlap, Serial No. 457,474, a system of freight-loading apparatus is disclosed which employs opposed, aligned patterns of fixed structural members on two surfaces enclosing a freight-supporting area, usually one pattern on the freight-supporting surface itself and another supported on the overhead above the latter, which fixed structural members have on their exposed surfaces a pattern of holes and/or lines of holes in which re-usable bracing and dunnage members may be anchored by means of pins.

The prior art freight stowage systems have in all cases, as far as I am aware, used freight bracing members which required direct manual operation or special tools either to be locked in place, to be removed, or both. In many instances the bounding surface or surfaces are inaccessible to the operator of the equipment due to height or obstructions or because it is not convenient to utilize a tool to place the member and anchor it in the surface.

The principal object of this invention, therefore, is to provide a freight bracing member that can be locked into place, unlocked and removed from the cooperating structure without the use of tools, ladders, and the like, when the cooperating structure is not readily accessible for a direct manual operation.

Another object of this invention is to provide a freight bracing member having an end fitting that can be operated by movements of the freight member itself so as to lock it in place, unlock it and remove it from the cooperating overhead structure without the use of tools, ladders, and the like, and especially when the height or distance between the freight supporting surface and the overhead is too great to permit direct manual operation of one of the latching members.

Still another object of this invention is to provide a freight bracing member having an end fitting which is operated by a combination of telescoping movements of the member and the force of gravity which serves to unlatch members of the latching mechanism, which member is installed in the cooperating wall structure by appropriate reciprocating movements of the telescoping portions of the freight bracing member.

Other objects and advantages of this invention will be apparent, or will become apparent in the description to follow, especially when taken in conjunction with the accompanying drawings in which:

Figure 1 is a side view in section and with portions broken away, of a freight bracing member of this invention having on one end a latching fitting of the remotely-operated type, which is shown in the "set" position ready for entry into the cooperating structure, and on the opposite end a fitting of the direct manually operated type, the section in this figure being taken along the line 1—1 of Fig. 5;

Fig. 2 is a fragmentary side view in section similar to that of Fig. 1 of the freight bracing member of Fig. 1 showing the remotely-operated end fitting in the "act of latching" position in which the latching mechanism is shown related to the cooperating structure with the trigger still in the "set" position;

Fig. 3 is a side view with portions broken away similar to that of Fig. 1 but showing a complete freight bracing member having both end fittings of the remote operating type, the latches being shown locked into the cooperating structure and the trigger in the safety-locked position, and showing in addition a means for locking the telescoping portions of the member against relative movement and a means of limiting the telescopic travel of the housing members;

Fig. 4 is a fragmentary side view in section similar to that of Fig. 2 showing the housing-operated trigger in the act of unlocking the latch for withdrawal from the cooperating wall structure;

Fig. 5 is an end view of the remotely-operated latching fitting of this invention; and Fig. 6 is a side view in section with portions broken away of the freight bracing member of Fig. 1, the section being taken along the line 6—6 of Fig. 5.

In accordance with this invention there has been provided a freight bracing member than can be locked in place and removed by manipulating the member from a location thereon remote from the end fitting in question, causing said fitting to lock to, or disengage from, a corresponding attaching point. The freight bracing member of this invention has one or more end fittings of the remote-operating type, that is, a remotely-operated latch fitting on each end, or a remotely-operated fitting on one end and a manually-operated type of fitting on the opposite end. The freight bracing member of this invention will have remotely operable end fittings on one or both ends, depending on the type of installation in which the member is to be used, for example, the remotely-operating fitting could be used to advantage on the upper end of a vertical freight bracing member where the overhead members are too high for direct manual operation of the latches or on one or both ends for use in a horizontal position where the attaching surface or surfaces are inaccessible. This remotely-operated type of latching device is arranged to be operated by appropriate sliding or telescopic movements of the member itself. The force of gravity is employed to retract latching members after release by sliding movement of a part of the member itself.

Referring now to the accompanying drawings, it will be seen that Fig. 1 shows a freight bracing member having a remotely-operated type of latch fitting on one end and on the other end a manually-operated type of latch fitting. Fig. 3, on the other hand, shows a freight bracing member having remotely-operated latching fittings on both its ends. Referring specifically now to Fig. 1, it will be seen that the freight bracing member of this invention comprises an elongated body member 10 which may be of any shape or cross-section, but which preferably is square or rectangular in cross-sectional shape. On the upper end of the member as viewed in Fig. 1, it will be seen that the body member 10 has a tongue 12 for operating a latch trigger. In its exterior surfaces the body member 10 is provided with a regular pattern of holes 14 which correspond in spacing to the pattern of the remainder of the freight-bracing system. Into the open end of body member 10 there is inserted a remotely operating end fitting 16 which comprises a sleeve-like portion 18 which is slipped into the end of the body section 10. A slot 20 in body portion 10 cooperates with a screw or stud bolt 24 to limit the telescopic movements of sleeve 18 in body member 10. On the lower end of body member 10 there is provided a fixed manually-operated type of end fitting indicated generally by the numeral 26 having a sleeve-like portion 28 which fits inside the open end of body member 10. Bolts 30 secure the sleeve-like portion 28 of end fitting 26 in body member 10.

The remotely-operated end fitting 16 consists of two mating halves 32 (see Fig. 5) which are welded together and secured to the sleeve-like portion 18 by means of a yoke 19. Each of the fitting halves 32 have integral therewith a fixed straight-sided pin 34 having a conical head or nose portion 36. Passed through the halves 32 is a latch-pin or pivot-pin 38 which carries a pivotable latch-pin 40, having a shoulder 41 and conical nose portion 42. The pins 32, 40 are adapted to enter holes 14 in a cooperating wall structure, bracing member or other surface 44 to which the member is to be anchored. The latter holes have been given the same number as those appearing in the body of the freight bracing member, since their spacing and function are greatly similar.

Journaled on a small pin 46 is a trigger arm or member 48 having a nose portion 50 and an outwardly projecting trigger lever 52 on one side thereof and on the other side of the pivot pin 46 the trigger is shaped so as to have a notched-out portion 54, trigger toe 56 and a trigger heel 58. The notched-out portion 54 is adapted to be engaged by the tongue 12 of body member 10 upon the telescoping movement of the fitting 16 into and out of body member 10. The trigger 48 is so positioned and proportioned that the nose portion 50 can be brought into forcible contact with the side of the latch pin 40 when the notched-out portion 54 is in engagement with the tongue 12. Latch pin 40 likewise has a curved outwardly projecting portion 60, which may be called a tail, having a tapered cam surface 62 which is adapted to engage the trigger heel 58 and the trigger toe 56 as shown in Fig. 3. When the trigger 48 is rotated or pivoted to an in-line position such as is shown in Fig. 3 (and heel 58 and toe 56 have been brought into position in contact with cam surface 62), the trigger lever 52 projects outwardly in a position to be engaged by the tongue 12 of body member 10 when the body member 10 has been telescoped. This position of the trigger 40, best seen in Fig. 3, is the "safety-locked" position.

Connection between the trigger 48 and latch pin 40 is effected by a pair of springs 66 which are secured on each side of pin 40 to the ends of a pin 64 passed through trigger 48 and to the ends of a pin 68 passed through latch pin 40.

The body member 10 has a hole or slot 70 located rearwardly of the tongue 12 to provide a clearance space for trigger toe 56 while the tongue 12 is moved outwardly to contact trigger lever 52 to unlock the latch pin 40. The trigger 48 is shown most clearly in this position in Fig. 4.

The manually-operated latch fitting 26 on the bottom end of member 10, as shown in Fig. 1, comprises a shaft or pin 72 on which is journaled a pivotable latch lever 74. Integral with latch lever 74 is a shouldered latch pin 76 having a shoulder 78 for engaging under the edge of hole 14 of cooperating member 44 and a conical nose portion 80. The latch pin 76 projects through a hole 82 in end plate 84 so as to be capable of pivotal movements. The latch lever 74 has outwardly projecting operating handles 86, 88 positioned for easy access from the side of the fitting. A spring 90 anchored on one end to a pin 92 secured in sleeve 28 and to an anchor arm 94 on lever 74 serves to bias the latter to the locked position. The handles 86, 88 must be operated by hand to unlock the fitting 26 from a cooperating structure. Secured to the end plate 84 on each side of the latch pin 76 is a fixed, straight sided pin 98 having a tapered nose portion 96.

In Fig. 3 there is shown a second freight bracing member having a remotely-operable latch fitting 16 on each end. The latter fittings and the member itself are identical in design to that of Figs. 1 and 6 and corresponding parts have accordingly been identified by the same reference numerals. Since the member of Fig. 3 has two remote-operating fittings which are operated by appropriate telescoping movements of the body portion 10, means must be provided to prevent telescopic movements of the parts when the member is in bracing position lest the weight of the member or a load placed thereon should operate one of the latches. Such means comprises a lock pin 100 inserted through the holes 14 of the body 10 and through aligned holes 102 in sleeve-like member 18. Such a lock pin comprises a tubular outer shell 104 through which is inserted a rod 106. On one end of the latter there is attached an eccentrically mounted handle 108 and on the other end a collar-like compressible member 110 which is secured thereto by a metal collar, washer or nut 112. When the handle 108 is rotated to the position shown in Fig. 3 in solid outline, the member 110 is compressed to enlarge its diameter and prevent withdrawal of the pin 100. When handle 108 is rotated 180° to the position shown in phantom, the member 110 is no longer compressed and the latch pin 100 can be withdrawn from the holes to reciprocate the body member 10 to unlatch the end fittings. In most cases only one such lock pin need be utilized. Where loads or forces are apt to be applied in both directions longitudinally of the body member 10, a lock pin would be required for each end fitting 16.

*Operation*

The freight bracing member of this invention is installed by first setting the trigger 48 to the "set" or "cocked" position. This is done by pulling the fitting 16 outwardly of the body 10 until the tongue 12 engages the notch 54 of trigger 48, as appears in Fig. 1. The member then is brought into position for insertion into the holes 14 of cooperating member. When a push is exerted on the body, the force is transmitted through the trigger 48 to hold the latch pin 40 in position. As the pins 34, 40 start to enter the holes 14, their conical or tapered nose portions 36, 42 serve as a pilot to facilitate entry. The latch pin is moved to the position shown in phantom in Fig. 2 so that continued force exerted on the member causes the pins to enter the holes. When entry is completed and the force on the member relaxed, the springs 66 cause the latch pin to snap into the locked position shown in solid outline in Fig. 2.

While Fig. 2 shows the fitting 16 in the locked position, when the body 10 is withdrawn from contact with the trigger notch 54, the springs 66 cause the trigger 48 to rotate to the "safety-locked" position. In this position, shown in Fig. 3, the trigger toe 56 and trigger heel 58 ride up and come into contact with cam surface 62 of latch pin tail 60 and the trigger assumes an "in-line" position more or less parallel to latch pin 40. The latch pin 40 is then mechanically locked in position and the springs 66 do not take any of the forces exerted on latch pin 40, these forces being taken directly by trigger 48. In the safety-locked position, also, the trigger toe 56 is out of the path of travel of the body tongue 12 so that the latter can contact trigger lever 52 on the next telescopic movement of the body 10 towards the fitting 16.

With the remotely-operated fitting 16 in place as described above, the manual fitting 26 is then located with its pins over the holes and the member forced down into the holes; the conical, tapered noses 80, 96 of the pins 76, 98 causing the latter to enter the holes without attention to the latch. As before, spring 90 causes the latch pin 76 to snap into the locked position as soon as pin 76 has entered the hole. The member is then in bracing position. To remove the member 10 from the cooperating structure 44, the manual end fitting 26 is first unlocked by pulling or pushing on either of handles 86, 88 to bias the latch pin 76 to the unlocked position and then pulling upwardly until the pins 76, 98 clear the holes 14. The body 10 of the member then can be pushed upwardly or lifted toward fitting 16 until tongue 12 comes in contact with trigger lever 52. Further advance of the body 10 causes the trigger 48 to be rotated out of the safety-locked position and its nose 50 brought into contact with the side of latch pin 40. At the same time the rotation of the trigger 48 causes its toe portion 56 to proceed through clearance hole or slot 70 thereby clearing cam surface 62 of latch pin tail 60. Continued advance of the body 10 then causes the trigger nose 50 to move the latch pin 40 to the unlocked position shown in Fig. 4. The pins 34, 40 can then be withdrawn from the holes 14 in structure 44. In the unlocked position release of the pushing force on body 10 normally would permit the springs 66 to tend to return the trigger and latch pin to the locked position. However, the action of gravity or the weight of the parts and frictional forces between sleeve 18 and body 10 would tend to oppose the action of the springs and maintain the unlocked position so that the member could be removed from structure 44. If the springs do lock the mechanism after withdrawal, it can easily be "reset" or "locked" again as shown in Fig. 1. After withdrawal of the upper fitting 16 the member is completely disengaged.

Erection or installation of the member shown in Fig. 3 is much the same, the same procedure as described above being followed for each end fitting. When both fittings are in the safety-locked position, the body 10 is moved slightly one way or the other to bring one of its holes 14 in alignment with a hole 102 in the sleeve 18. A lock pin 100 is then inserted and its handle rotated to the locked position. In most cases, if the bracing member is being used in a vertical position, only the remotely-operated fitting 16 on the bottom end need be locked, as just described, to support the weight of the member. Where lifting forces would be exerted in the vertical position, or where the member is being used in the horizontal position, it may be desirable to insert lock pins in both end fittings to prevent chance operation of the latch triggers by telescoping movements of the body 10 of the member.

The member of this invention greatly speeds the erection, securing and removal of freight bracing members in difficult positions in a freight storage area. In fleet supply vessels wherein freight must be broken out at sea or while under way, the freight bracing member of this invention facilitates breakout of the desired items and resecuring of the remaining freight. One man operation of the member is made possible since both of the operator's hands are left free to handle the member itself.

What is claimed is:

1. In a freight securing bar, an elongated body, a fitting telescopically mounted on one end of the body, a fixed pin secured to the fitting and projecting outwardly therefrom, a movable pin secured to the fitting and projecting outwardly therefrom, said pins being capable of extending simultaneously in openings in a support member for the bar, one of said pins having a locking surface thereon for locking the bar to such support member, movable actuator means secured to the fitting for moving the movable pin, and means connected to said body operatively engageable with said actuator means to operate said actuator means upon relative telescopic movement of the body and fitting and thereby cause said actuator means to move said movable pin.

2. The invention set forth in claim 1 including locking means secured on the body and locking means secured on the actuator engageable with each other in a certain relative telescopic position of the fitting and body and acting to lock the actuator against movement.

3. In a freight bracing bar, an elongated body, a support means mounted on one end of the body for movement relative to the body along the length of the body, a movable locking member secured to said support means and movable to a locking position and a non-locking position, a movable actuator member secured to said support means and having means thereon for connection to said locking member to control the position of said locking member, and shoulder means secured to said actuator member and engageable with said body upon movement of the support means relative to the body along the length of the body so that said movement moves said actuator member to control the position of said locking member.

4. The structure of claim 3 including spring means supported on the support means connecting the locking member and actuator member together and operative to bias the locking member toward a locking position.

5. The structure of claim 4 including a contact portion on said locking member and positioned to engage with said actuator member when said actuator member is in locking position and operative to transmit locking loads directly to said actuator member and by-pass said spring means.

6. The structure of claim 3 including pivot means mounting the actuator member on the support means for angular movement, said shoulder means comprising a pair of spaced shoulders located on opposite sides of said pivot means, one of said shoulders being engageable by said body to angularly move said actuator member in one direction and effect movement of the locking member to locking position, and the other of said shoulders being engageable by said body to angularly move said actuator member in the opposite direction and effect movement of said locking member to non-locking position.

7. A freight bracing member for attachment to a cooperating structure comprising an elongated body portion, a fitting telescopically mounted on at least one end of said body portion, and a remotely operated latching mechanism secured to said fitting, said latching mechanism including a pivotally mounted latch pin secured to said fitting having shoulder means positioned to engage the edge of a hole in a cooperating structure in which it is inserted, said mechanism further including a pivotally mounted trigger member secured to said fitting so as to contact said latch pin, spring-biasing means carried by said fitting and connecting said latch pin and said trigger member together so as to normally urge said latch pin into locking position, and shoulder means provided on said trigger member contacting said body portion when said fiting is telescoped toward said body portion so as to move said trigger member and force said latch pin to the unlocked position.

8. A freight bracing member for attachment to a cooperating structure comprising an elongated, hollow body portion and latch fitting mounted the end of said body portion, said latch fitting being of a remotely operated type and comprising a sleeve-like member telescopically fitted into the end of said body portion to move telescopically therein, said shouldered latch pin being pivotally mounted in the outer end of said sleeve-like member in a position to engage the edge of a hole in a cooperating structure, at least one fixed pin secured to said sleeve-like member in a position to enter another hole in said cooperating structure, a pivotally mounted trigger member secured on said sleeve-like member and in a position to contact said latch pin, said trigger member having a lever portion and a toe portion projecting therefrom in a position to be engaged by said body portion upon telescopic movement between sleeve-like member and said body, said trigger member having a heel portion, said latch pin having an outwardly curved tail portion to engage said heel portion to transmit unlocking loads on the latch pin directly to said heel portion, and a spring biasing means connecting said latch pin and said trigger to normally bias said latch pin to the locked position and to urge said trigger member heel portion into engagement with said latch pin tail portion.

9. A freight bracing member as defined in claim 8 and further characterized in that the outer end of said body portion is shaped in the form of a projecting tongue to contact said trigger member lever portion and an aperture is provided in said body inwardly of said tongue to receive said trigger member toe and heel portions when said sleeve-like member is telescoped inwardly of said hollow body portion.

References Cited in the file of this patent
UNITED STATES PATENTS

| | | |
|---|---|---|
| 1,085,836 | Abadie | Feb. 3, 1914 |
| 2,354,861 | Hermann | Aug. 1, 1944 |
| 2,576,425 | Thearle | Nov. 27, 1951 |
| 2,614,781 | Engel | Oct. 21, 1952 |